July 27, 1937. A. SCHLESINGER Re. 20,458

INKING APPARATUS AND METHOD OF OPERATING THE SAME

Original Filed March 7, 1932 3 Sheets-Sheet 1

INVENTOR

Alfred Schlesinger,

By Wheaton, Orth, Morse & Grindle

Attys

INKING APPARATUS AND METHOD OF OPERATING THE SAME

Original Filed March 7, 1932 3 Sheets-Sheet 2

INVENTOR

Alfred Schlesinger,

By Watson, Cole, Grindle & Watson

Attys

July 27, 1937. A. SCHLESINGER Re. 20,458

INKING APPARATUS AND METHOD OF OPERATING THE SAME

Original Filed March 7, 1932 3 Sheets-Sheet 3

INVENTOR

Alfred Schlesinger,

By Watson, Cole, Grindle & Watson

Attys

Reissued July 27, 1937

Re. 20,458

UNITED STATES PATENT OFFICE 20,458

INKING APPARATUS AND METHOD OF OPERATING THE SAME

Alfred Schlesinger, Aldwych, London, England

Original No. 1,980,639, dated November 13, 1934, Serial No. 597,362, March 7, 1932. Application for reissue November 5, 1936, Serial No. 109,319. In Germany July 16, 1929

15 Claims. (Cl. 101—350)

Figure 1:
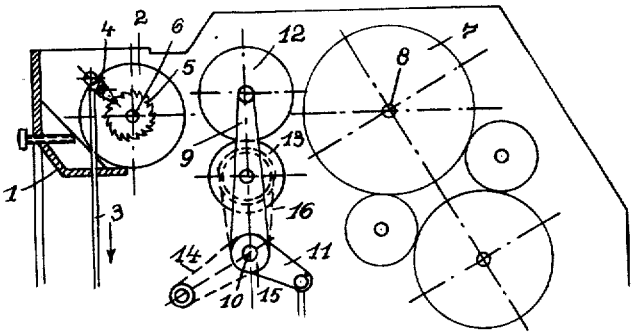

My invention relates to improvements in inking apparatus and the method of operating the same, and more particularly in inking apparatus for printing machines in which the ink is taken from a container by a conducting member in the form of strips. If a somewhat tough ink is used in the printing machine, it is necessary thoroughly to rub the same before applying the same to the printing apparatus, and further, it is necessary to heat the ink during the rubbing operation in order to reduce the toughness thereof. In machines now in use it was not possible to provide the necessary length of way for satisfactorily rubbing the ink without providing complicated devices. The ink may be heated by the rubbing rollers. However, hot rollers are objectionable for the reason that the ink is separated into its components, and therefore hot rollers must be avoided as far as possible, and it is preferred to heat the ink by the rubbing operation itself.

The object of the improvements is to provide an inking apparatus which requires little space so that it may be readily mounted in printing machines, and which permits energetic rubbing and mixing of the ink, and which at the same time is adapted to heat the ink so as to reduce its toughness. With this object in view my invention consists in providing a subsidiary rubbing apparatus intermediate the said ink container and the rubbing rollers associated with the printing apparatus, which subsidiary rubbing appartus is adapted to be brought into and out of engagement with the conducting member and the main rubbing rollers and to rub the ink applied thereto for a suitable length of time without simultaneously transmitting the same to the main rubbing devices. Thus the desired degree of plasticity is imparted to the ink on the subsidiary rubbing apparatus by the mechanical rubbing operation and the heat produced thereby. For transmitting the ink from the conducting member to the subsidiary rubbing apparatus and from the latter to the main rubbing rollers, the subsidiary rubbing apparatus is mounted for being bodily movable from the conducting member into an intermediate position and from the intermediate position into contact with the main rubbing member.

In the preferred construction I provide a plurality of subsidiary rubbing devices which are alternately operative, and in which the first one of the subsidiary rubbing apparatus takes the ink from the conducting member and rubs the same while it is moved towards the first cylinder of the main rubbing apparatus. When the said rubbing apparatus has been brought into cooperation with the main rubbing apparatus the second rubbing apparatus is brought into engagement with the conducting member for taking therefrom a fresh supply of ink, the operation being continuously repeated. I wish it to be understood that in a similar way more than two subsidiary rubbing apparatus may be provided.

Instead of taking a single strip of ink from the conducting member during each operation of the subsidiary rubbing apparatus, the conducting member may be constructed so as to transmit a plurality of strips of ink to the rubbing apparatus for supplying ink to a plurality of successive printing operations. For this purpose the conducting apparatus may be provided with means such as a pawl and ratchet mechanism for imparting intermittent rotary movement thereto. By rubbing the ink being transmitted from the conducting member to the main rubbing apparatus by means of the said bodily movable rubbing apparatus, the strips of ink are distributed so that the strips are not distinguished any more on the print.

From the foregoing brief description of the invention it will be understood that a subsidiary period of time for rubbing is interposed, while obviating large rubbing apparatus, by providing bodily movable rubbing apparatus.

Figure 2:
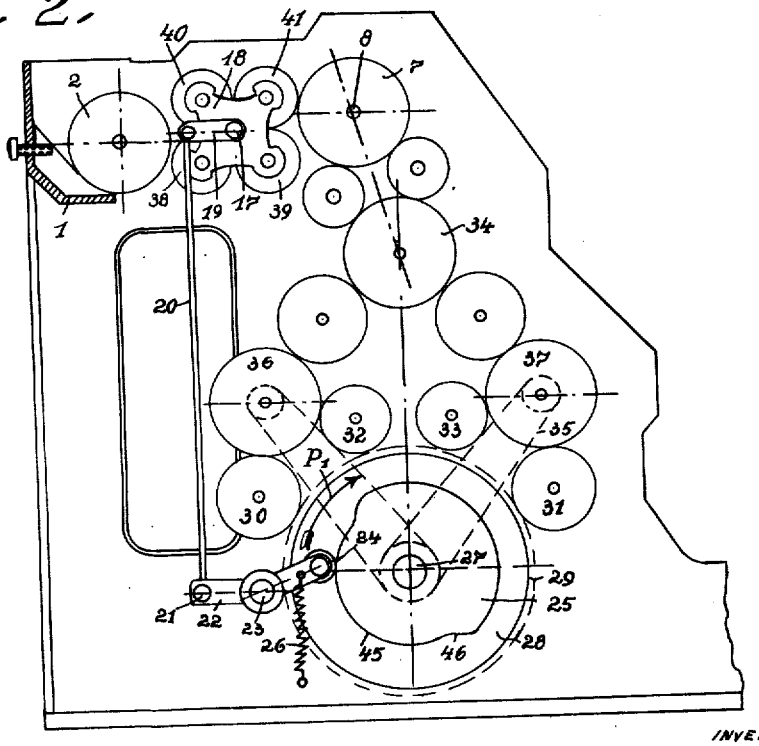
Figure 3:
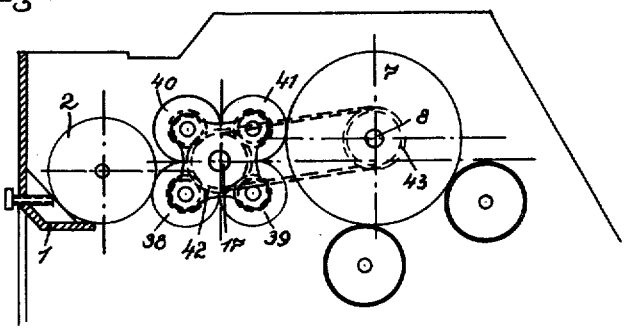
Figure 4:
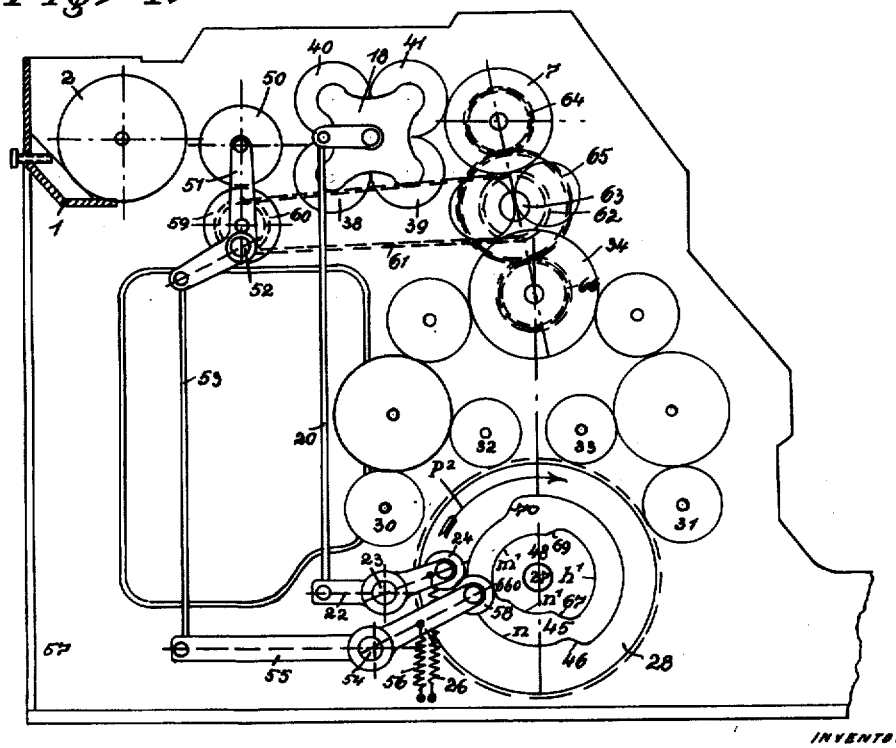
Figure 5:
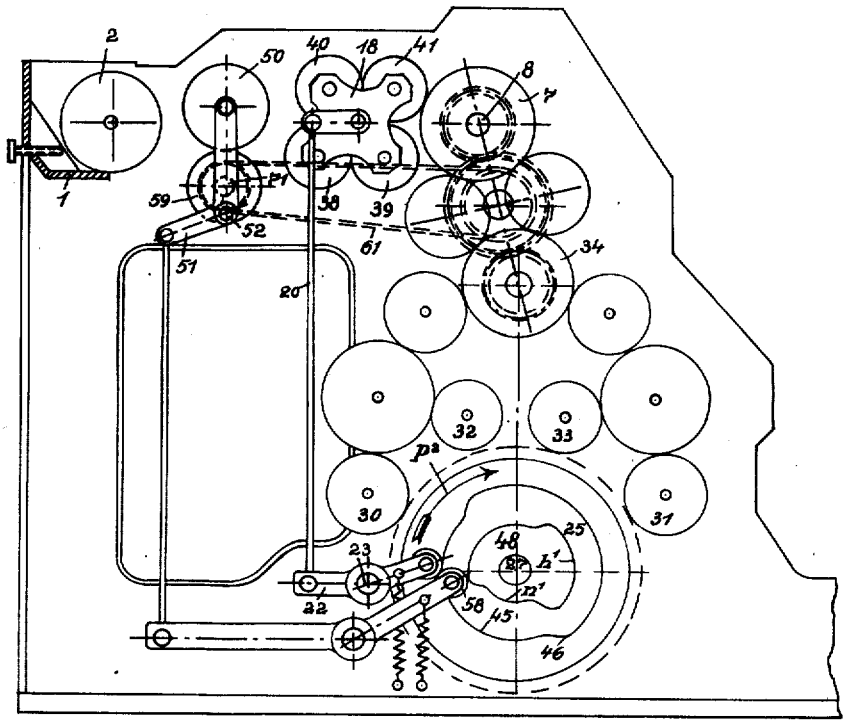

For the purpose of explaining the invention several examples embodying the same have been shown in the accompanying drawings in which the same reference characters have been used in all the views to indicate corresponding parts. In said drawings, Fig. 1 is a diagrammatical elevation partly in section illustrating the principle of the invention, Fig. 2 is an elevation partly in section showing my improved rubbing apparatus in connection with a printing machine, Fig. 3 is a similar elevation showing a modification, Fig. 4 is a similar elevation showing another modification in which two bodily movable rubbing apparatus are provided, and Fig. 5 is a similar elevation showing a printing machine cooperating with a rubbing apparatus, the rubbing apparatus being similar to but slightly modified as compared to the apparatus illustrated in Fig. 4.

In the example illustrated in Fig. 1 the inking apparatus comprises a container 1 provided with a conducting member 2 in the form of a roller adapted to take strips of ink therefrom and provided with means, such as a pawl and ratchet mechanism, for intermittently rotating the same. As is shown the said mechanism comprises a ratchet wheel 5 secured to the shaft 6 of the conducting member 2 and a pawl 4 engaging the said ratchet wheel and adapted to be operated by a link 3. From the conducting member 2 the ink is transmitted to the first cylinder 7 of the main rubbing apparatus, and from the said cylinder the ink is transmitted to other rubbing rollers.

The shaft 8 of the cylinder 7 is located at a distance from the conducting member 2 so that the roller 2 and the cylinder 7 are out of contact with each other, and between the said roller and cylinder two rollers 12 and 13 are located which are mounted on a lever 9 rockingly supported on a shaft 10, the said lever 9 being adapted to be rocked by means of a link 11. The shaft 10 is adapted to be rotated by suitable means such as a rope gearing 14, and such rotary movement is transmitted by means of a pulley 15 and a belt 16 to a pulley secured to the axis of the roller 13 and operatively connected with the roller 12 by gear wheels (not shown), and preferably the gear ratio is such that the rollers slide on each other. Thus the rollers 12 and 13 have a function similar to a paint mill. However, they are distinguished from paint mills now in use in so far as the said paint mills are located outside the printing machine, so that the ink must first be transmitted into the same and thereafter returned to the inking machine, which causes loss of ink and dissociation of the components thereof.

In a modification of the apparatus only the roller 13 is driven. In this case the roller 12 takes part in the rotary movement while the rollers are bodily moved from the roller 2 to the cylinder 7, and when the roller 12 engages the conducting roller 2 is retarded so that the rubbing operation is varied. Thus the ink is distributed on the roller 12, and the temperature is raised.

In the modification shown in Fig. 2 the ink container, the conducting member 2 and the rubbing apparatus comprising the cylinder 7 are the same as has been described with reference to Fig. 1, and the same letters of reference have been used to indicate corresponding parts. Between the conducting member 2 and the first rubbing cylinder 7 a star member 18 is located which is rockingly mounted on a shaft 17. To the shaft 17 an arm 19 is secured which is jointed to a link 20. The bottom end of the said link is jointed at 21 to a lever 22 having its fulcrum at 23, and the free end of the lever 22 carries a roller 24 engaging a cam disk 25. The said roller is held in contact with the cam disk 25 by suitable means such as a spring 26. The cam disk 25 is secured to the shaft 27 of a printing cylinder 28 having a platen 29 secured thereto, the said platen cooperating with four ink applying rollers 30, 31, 32, 33, which are connected by two sets of transmission rollers with a steel rubbing cylinder 34 and by further intermediate rollers with the rubbing cylinder 7. From the shaft 27 rotary movement is imparted to the rollers 36 and 37, for example by means of a chain, belt or rope gearing 35, and the said rotary movement is transmitted to the cylinders 34 and 7 and the intermediate rollers by gear wheels (not shown).

On the star member 18 two pairs of rollers 38, 39 and 40, 41 are mounted, the pair of rollers 38, 39 providing one of the aforesaid rubbing members, and the rollers 40, 41 a second set of rubbing members. For imparting rotary movement to the rollers 38, 39, 40 and 41 suitable mechanism may be provided. As shown in Fig. 3 a sprocket wheel 42 secured to the shaft 17 is connected by a chain with a sprocket wheel 43 secured to the shaft 8, and the sprocket wheel 42 is connected with a gear wheel meshing with gear wheels connected respectively with the rollers 38, 39, 40 and 41.

In the position of the parts shown in Fig. 2 the roller 24 engages a portion 45 of small radius of the cam disk 25, and the roller 41 is in engagement with the first rubbing cylinder 7. Simultaneously the roller 38 makes contact with the conducting member 2 and takes therefrom one or more strips of ink, according to the movement imparted to the conducting member 2. The ink is rubbed and heated between the rollers 38 and 39. The ink which before has been taken up by the roller 40 has been rubbed and heated between the rollers 40 and 41, and after being thus prepared it is now transmitted to the rubbing cylinder 7. If now the printing cylinder 28 is rotated in the direction of the arrow $P^1$ so far that the roller 24 is engaged by the shoulder 46 of the cam disk 25, the lever 22 is rocked in anticlockwise direction, the link 20 is pulled downwardly and throws the roller 40 of the set of rubbing rollers 40, 41 into engagement with the conducting member 2, and, simultaneously the roller 39 of the second set of rubbing rollers 38, 39 is brought into engagement with the steel cylinder 7. The operation is continuously repeated.

In Figs. 4 and 5 I have shown modifications in which between the alternately operative sets of rubbing rollers and the conducting member an apparatus is provided for taking the ink from the said conducting member and transmitting the same to the rubbing rollers, and the said transmitting apparatus is constructed for controlling the time of the transmission of ink from the conducting member 2 to the subsidiary rubbing apparatus.

As shown in Fig. 4 the roller 50 of the transmitting apparatus is mounted on a bell crank lever 51 which is rockingly mounted on a shaft 52, and which is connected by a link 53 with a lever 55 supported at 54. A spring 56 attached to the said lever and the frame 57 tends to rock the lever in clockwise direction. The free end of the lever 55 carries a roller 58 bearing on a cam disk 48 secured to the shaft 27 of the platen cylinder 28. The star member 18 on which the rollers 38, 39, 40 and 41 are rotatably mounted is adapted to be rocked by the same mechanism described with reference to Fig. 2 and letters of reference have been used to indicate corresponding parts.

Below the roller 50 a second roller 59 is mounted on the lever 51, and to the shaft of the said roller 59 a rope pulley or sprocket wheel 60 is secured which is connected by a rope or chain 61 with a rope pulley or sprocket wheel 62 secured to a shaft 63 and operatively connected with the rubbing cylinders 7 and 34 by means of gear wheels 64, 65 and 66, the said mechanism imparting continuous rotary movement to the roller 59, which is continuously in engagement with the roller 50.

The printing cylinder and the cam disks 25 and 48 are continuously rotated in the direction of the arrow $P^2$.

In the position of the parts shown in the figure the roller 41 of the set of rollers 40, 41 is in contact with the cylinder 7. The roller 50 has been removed from the conducting member 2 into an intermediate position between said member and the star member 18. After a slight rotary movement of the parts the roller 58 rides on a shoulder 660 of the cam disk 48 and it gets on the part $n^1$ of small radius of the said cam disk. Thereby the lever 51 is rocked from the position shown in Fig. 4 to the right, and, since the star member 18 is at rest, the roller 50 gets into engagement with the lower roller 38. Thereafter the roller 58 is engaged by the shoulder 67 of the cam disk 48 and it is shifted on the portion $h^1$ of highest radius of the cam disk 48. Thus the lever 55 is rocked through the largest angle in anti-clockwise direction, and it rocks the lever 51 in anti-clockwise direction until the roller 50 engages the conducting member 2 and takes the ink therefrom. The ink is thus taken up by the roller 50 while the roller 58 rolls on the portion $h^1$ of largest radius to the shoulder 69.

The roller 59 which is continuously rotated by the gearing 61, and which is always in contact with the roller 50, takes part in the rocking movement of the lever 51, and this is possible because practically the lateral movement of the said roller is small, so that the rope 61 can yield sufficiently. While the roller 50 during movement of the roller 58 on the cam disk 48 from 67 to 69 takes up several strips of ink from the intermittently rotating conducting member 2 and is rotated from the said conducting member, the roller 59 continues its uniform rotary movement, so that the ink is rubbed between the rollers 50 and 59 acting as a mill.

When the shoulder 67 of the cam disk 48 engages the roller 58 the shoulder 46 of the cam disk 25 engages the roller 24 of the lever 22 and rocks the said lever anti-clockwise, whereby the roller 40 of the star member 18 is brought into its extreme position to the left. Finally, while the star member 18 remains in position the roller 58 leaves the shoulder 69 and gets on the portion $m^1$ of medium radius of the cam 48, which position is indicated at Fig. 4. Shortly after this movement the roller 24 controlling the movement of the star member 16 leaves the shoulder 70 of the cam disk 26 and engages the portion $n$ of smallest radius, so that the lever 22 is rocked in clockwise direction and into the position shown in Fig. 4.

In the construction shown in Fig. 4 the roller 50 is in contact with the conducting member 2 for a considerable length of time, and the roller 50 is continuously in engagement with the driven roller 59. Preferably the rollers 50 and 59 are simultaneously shifted relatively to each other in axial direction.

The construction and operation of the rollers 50 and 59 correspond to the construction and operation described with reference to Fig. 1.

The modification shown in Fig. 5 is similar to the construction shown in Fig. 4, and it is distinguished therefrom in that the roller 59 to which rotary movement is imparted by means of the chain or rope 61 is not mounted on a lever but on a shaft 71. The roller 50 is mounted on the bell crank lever 51. But the axis 52 of the said bell crank lever is located below the shaft 71 of the roller 59.

If, in the construction shown in Fig. 5 the roller 50 is brought into engagement with the conducting member 2 by the roller 58 engaging the portion $h^1$ of largest radius of the cam disk 48, the roller 50 and the roller 59 have been brought out of contact, and the roller 50 is acted upon only by the intermittent rotary movement of the conducting member 2, which member transmits successive strips of ink to the roller 50. Only in the position of the parts shown in Fig. 5 the roller 59 has a rubbing effect on the ink applied to the roller 50, and when the roller 50 is moved to the right by the roller 58 engaging the portion $n^1$ of smallest radius of the cam 48 the rollers 50 and 59, are brought out of engagement with each other, while, according to the position of the star member 18, the roller 50 engages either the roller 40 or the roller 38 for transmitting ink thereto.

The apparatus shown in Fig. 5 is more simple in construction than the apparatus described with reference to Fig. 4, and it can be manufactured at lower cost, because mechanism for regulating the tension of the rope or chain 61 may be dispensed with, which mechanism will be provided in the construction shown in Fig. 4, because the roller 59 is bodily movable. On the other hand, the rubbing action of the apparatus shown in Fig. 4 is more effective than that described with reference to Fig. 5. The cam disks 25 and 48 controlling the operation of the intermediate rubbing rollers are mounted on the shaft 27 so that they may be readily removed therefrom for mounting thereon cam disks of other configuration. Thereby the timing of the operation may be varied. Further, the cam disks may be mounted on the shaft in different angular positions relatively to the platen cylinder.

In the rubbing apparatus described in the figures ink of any quality may be used and more particularly concentrated ink. Thus any preparation of the ink may be dispensed with and particularly it is not necessary to dilute the same, which would impair the inking intensity. Therefore with a minimum of ink high covering power may be obtained. This is important in the printing process in so far as a sharp print is produced, and the surface of the paper is not injured by the toughness and the adhesion of the ink. Further it is not necessary to put protective sheets between the prints preventing transmission of ink from one sheet to the other when assembling the same into piles. Finally spoiling of the folding apparatus, guide shafts, and the like, is prevented also when printing the sheets on both sides.

While in describing the invention reference has been made to particular examples embodying the same I wish it to be understood that my invention is not limited to the constructions shown in the accompanying drawings and that various changes may be made in the general arrangement of the apparatus and the construction of its parts without departing from the invention.

I claim:

1. An inking apparatus, comprising a member for supplying ink, a main rubbing apparatus comprising an ink receiving member, a subsidiary rubbing apparatus, comprising rollers, means for bodily moving said subsidiary rubbing apparatus from said ink supplying member to said receiving member for transmitting ink from said supplying member to said receiving member, and means for rotating said rollers with a circumferential velocity different from the velocities of said ink supplying and ink receiving members.

2. An inking apparatus, comprising an ink supply, and a main ink rubbing apparatus, of a subsidiary rubbing apparatus comprising a plurality of sets of cooperating rubbing rollers adapted for successive engagement with said main rubbing apparatus, means for successively throwing said sets into engagement with said main apparatus, means for rotating the rollers of said sets, a second subsidiary rubbing apparatus bodily movable from said supply to any one of the sets of rubbing rollers of the first named subsidiary rubbing apparatus for transmitting ink from said supply to said sets and comprising a plurality of rubbing rollers adapted to rotate with different circumferential velocities, and means for bodily moving said second subsidiary rubbing apparatus from said supply to said first named subsidiary rubbing apparatus.

3. An inking apparatus as claimed in claim 2, in which exchangeable cam disks are provided for bodily moving said first and second subsidiary rubbing apparatus.

4. An inking apparatus, comprising a supply of ink, a member having intermittent movement for taking ink from said supply, a main rubbing apparatus, a subsidiary rubbing apparatus bodily movable from said member to said main rubbing apparatus, and means for bodily moving said subsidiary rubbing apparatus from said member to said main rubbing apparatus, said moving means being constructed for holding said subsidiary rubbing apparatus in engagement with said member a period of time sufficient for transmitting several strips of ink.

5. In inking apparatus, the combination with a train of rollers, of an ink supply roller, and means for transmitting ink from said ink supply roller to a roller of the train, said means comprising a pair of ink transmitting rollers supported for continuous engagement with each other and for unitary movement into alternate operative engagement with said ink supply roller and the said roller of the train, means for effecting such unitary movement, and means for rotating said ink transmitting rollers at different rates of speed during such movement to effect rubbing of the ink.

6. In inking apparatus, the combination with a train of rollers, of an ink supply roller, and means for transmitting ink from said ink supply roller to a roller of the train, said means comprising a pair of ink transmitting rollers, a pivotally mounted member, said ink transmitting rollers being supported for rotation in engagement with each other about axes spaced from the pivotal mounting of said member, means for swinging said member about the pivotal mounting thereof to alternately engage one of said ink transmitting rollers with said supply roller and the said roller of the train, and means for rotating said ink transmitting rollers at different rates of speed during such movement to effect rubbing of the ink.

7. An inking apparatus comprising a supply of ink, a main ink rubbing apparatus, a subsidiary ink rubbing apparatus comprising a plurality of rollers and bodily movable from said ink supply to said main rubbing apparatus for transmitting ink from said supply to said main rubbing apparatus, means for imparting rubbing movement to the rollers of said subsidiary inking apparatus, and mechanism for bodily moving said subsidiary inking apparatus from said ink supply to said main rubbing apparatus, said mechanism including an element for temporarily arresting the said subsidiary inking apparatus in an intermediate non-transfer position while the rubbing operation of its rollers continues.

8. An inking apparatus comprising a supply of ink, a main ink rubbing apparatus, a subsidiary ink rubbing apparatus comprising a plurality of rollers and bodily movable from an ink receiving position to an ink transfer position, means for imparting rubbing movement to the rollers of said subsidiary inking apparatus, and mechanism for bodily moving said subsidiary inking apparatus from said ink receiving position to said ink transfer position, said mechanism including an element for temporarily arresting the said subsidiary inking apparatus in a non-transfer position while the rubbing operation of its rollers continues.

9. An inking apparatus for inking the printing form of a printing machine including, in combination, an ink-fountain roller, a series of rollers for transferring ink from the ink-fountain roller to the printing form, said series including a plurality of subsidiary ink rubbing rollers arranged in constant contact, means for rotating said subsidiary ink rubbing rollers, and mechanism for shifting said rollers periodically from ink receiving to ink transfer positions, said mechanism including an element operative to hold the said rollers momentarily in a neutral position while the rubbing operation continues.

10. In inking apparatus comprising a supply of ink, a main ink-rubbing apparatus, and means for transmitting ink from said supply to said main rubbing apparatus, said means including a subsidiary ink rubbing apparatus comprising a plurality of pairs of cooperating rollers, said rollers being supported for unitary bodily movement into and out of an ink receiving and an ink transfer position, one set of rollers rubbing the ink as rubbed ink is transferred from the other set, and vice versa, means for rotating said subsidiary cooperating rollers, and means for effecting the bodily movement of said sets of rollers.

11. An inking apparatus for inking the printing form of a printing machine including, in combination, an ink-fountain roller, a series of rollers for transferring ink from the ink-fountain roller to the printing form, said series including two sets of subsidiary ink rubbing rollers movable bodily from an ink receiving position to an ink transfer position and adapted each successively first to rub a supply of ink and then transfer it, one set of rollers rubbing the ink as rubbed ink is transferred from the other set, and vice versa, means for rotating the rollers of said sets, and means for effecting the bodily movement of said sets of rollers.

12. An inking apparatus for inking the printing form of a printing machine including, in combination, an ink-fountain roller, a series of rollers for transferring ink from the ink-fountain roller to the printing form, said series including a plurality of subsidiary ink-rubbing rollers arranged in constant contact, mechanism for effecting a relative movement between the subsidiary ink-rubbing rollers on the one hand and other rollers of said series on the other hand for the delivery of a supply of unrubbed ink from the fountain roller to the subsidiary ink-rubbing rollers and the transfer of rubbed ink from the subsidiary ink-rubbing rollers to other rollers of the series for transmission to the printing form, said mechanism including an element for establishing a distinct pause in such relative movement of the rollers to interrupt the supply and transfer of ink during said pause while the rubbing operation of the subsidiary ink-rubbing rollers continues, and means to effect the ink-rubbing operation of said subsidiary rollers.

13. The method of conditioning printing ink in its transmission from the ink supply to the inking rollers of a printing machine, which ink is unsuitable for printing if subjected to a rubbing action incident only to distribution during transfer, which method consists in isolating for a given period a definite charge of ink to be used for printing, then during such period of isolation subjecting said charge of ink to an auxiliary rubbing action of such intensity as to develop enough frictional heat to bring the whole charge of ink to a uniform condition of fluidity suitable for printing, and thereafter transferring the charge of frictionally heated ink for transmission to the inking rollers of the machine.

14. In an inking apparatus adapted for conditioning ink in its transmission from the ink supply to the inking rollers of a printing machine, which ink is unsuitable for printing if subjected to a rubbing action incident only to distribution during transfer, the combination of means for isolating for a given period a definite charge of ink to be used for printing, means operative during such period of isolation for subjecting said charge of ink to an auxiliary rubbing action of such intensity as to develop enough frictional heat to bring the whole charge of ink to a uniform condition of fluidity suitable for printing, and means for thereafter transferring the charge of frictionally heated ink for transmission to the inking rollers of the machine.

15. The method of conditioning printing ink in its transmission from the ink supply to the inking rollers of a printing machine, which ink is unsuitable for printing if subjected to a rubbing action incident only to distribution during transfer, which method consists in conducting along separate paths successive definite charges of ink to be used for printing to isolate first one charge and then another each for a given period, then during its period of isolation subjecting each charge of ink to an auxiliary rubbing action of such intensity as to develop enough frictional heat to bring the whole charge of ink to a uniform condition of fluidity suitable for printing, and then transferring each charge of frictionally heated ink in turn for transmission to the inking rollers of the machine.

ALFRED SCHLESINGER.

CERTIFICATE OF CORRECTION.

Reissue No. 20,458. July 27, 1937.

ALFRED SCHLESINGER.

It is hereby certified that error appears in the above numbered patent requiring correction as follows: In the heading to the printed specification, line 8, strike out the words "In Germany July 16, 1929"; and that the said Letters Patent should be read with this correction therein that the same may conform to the record of the case in the Patent Office.

Sgined and sealed this 22nd day of February, A. D. 1938.

Henry Van Arsdale,
Acting Commissioner of Patents.

(Seal)